(12) United States Patent
Machida (10) Patent No.: US 6,728,627 B2
(45) Date of Patent: Apr. 27, 2004

(54) APPARATUS AND METHOD FOR MEASURING INTAKE AIR FLOW AMOUNT OF INTERNAL COMBUSTION ENGINE

(75) Inventor: Kenichi Machida, Atsugi (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/285,477

(22) Filed: Nov. 1, 2002

(65) Prior Publication Data

US 2003/0084861 A1 May 8, 2003

(30) Foreign Application Priority Data

Nov. 2, 2001 (JP) .......................................... 2001-338292

(51) Int. Cl.$^7$ .............................................. F02D 41/02
(52) U.S. Cl. ........................ 701/115; 123/346; 73/118.2
(58) Field of Search ................................. 701/102, 114, 701/115; 123/90.15, 90.17, 345, 346; 73/118.2

(56) References Cited

U.S. PATENT DOCUMENTS 5,495,830 A * 3/1996 Wu .......................... 123/90.15

FOREIGN PATENT DOCUMENTS

JP 2001-12262 1/2001

* cited by examiner

Primary Examiner—Andrew M. Dolinar
(74) Attorney, Agent, or Firm—Foley & Lardner (57) ABSTRACT

In an internal combustion engine provided with a variable valve mechanism that varies a valve operating characteristic of an intake valve, the valve operating characteristic of the intake valve is detected, and a flow loss coefficient and an effective opening area of the intake valve are calculated based on the valve operating characteristic, to calculate an intake air flow amount in a cylinder portion based on parameters inclusive of the calculated flow loss coefficient and effective opening area.

21 Claims, 14 Drawing Sheets

APPARATUS AND METHOD FOR MEASURING INTAKE AIR FLOW AMOUNT OF INTERNAL COMBUSTION ENGINE

FIELD OF THE INVENTION

The present invention relates to a technology for measuring an intake air flow amount in an internal combustion engine provided with a variable valve mechanism that varies a valve operating characteristic of an intake valve.

RELATED ART

Heretofore, there has been known a variable valve mechanism having a configuration of varying continuously valve lift amounts of exhaust/intake valves (refer to Japanese Unexamined Patent Publication No. 2001-012262).

Meanwhile, there has been proposed a control of intake air amount by varying a valve operating characteristic of an intake valve by such a variable valve mechanism.

In this intake air amount control, since it is possible to control an intake air amount by an intake valve just before a cylinder, a control excellent in a transient response characteristic can be performed. However, in order to control a fuel injection quantity without a delay for the intake air amount, it is required to measure with high accuracy an intake air flow amount in a cylinder portion.

SUMMARY OF THE INVENTION

The present invention has been accomplished in view of the above problem, and has an object to measure an intake air flow amount with high accuracy in an intake air amount control mainly by an intake valve.

In order to achieve the above object, the present invention is constituted to measure, in the following manner, an intake air flow amount of an internal combustion engine provided with a variable valve mechanism that varies a valve operating characteristic of an intake valve.

Firstly, a valve operating characteristic of the intake valve is detected. Then, a flow loss coefficient and an effective opening area of the intake valve are calculated based on the valve operating characteristic. Thereafter, an intake air flow amount in a cylinder portion is calculated based on parameters inclusive of the calculated flow loss coefficient and effective opening area.

The other objects and features of this invention will become understood from the following description with reference to the accompanying drawings.

PREFERRED EMBODIMENT

An embodiment of the present invention will be described based on the drawings.

Figure 1:
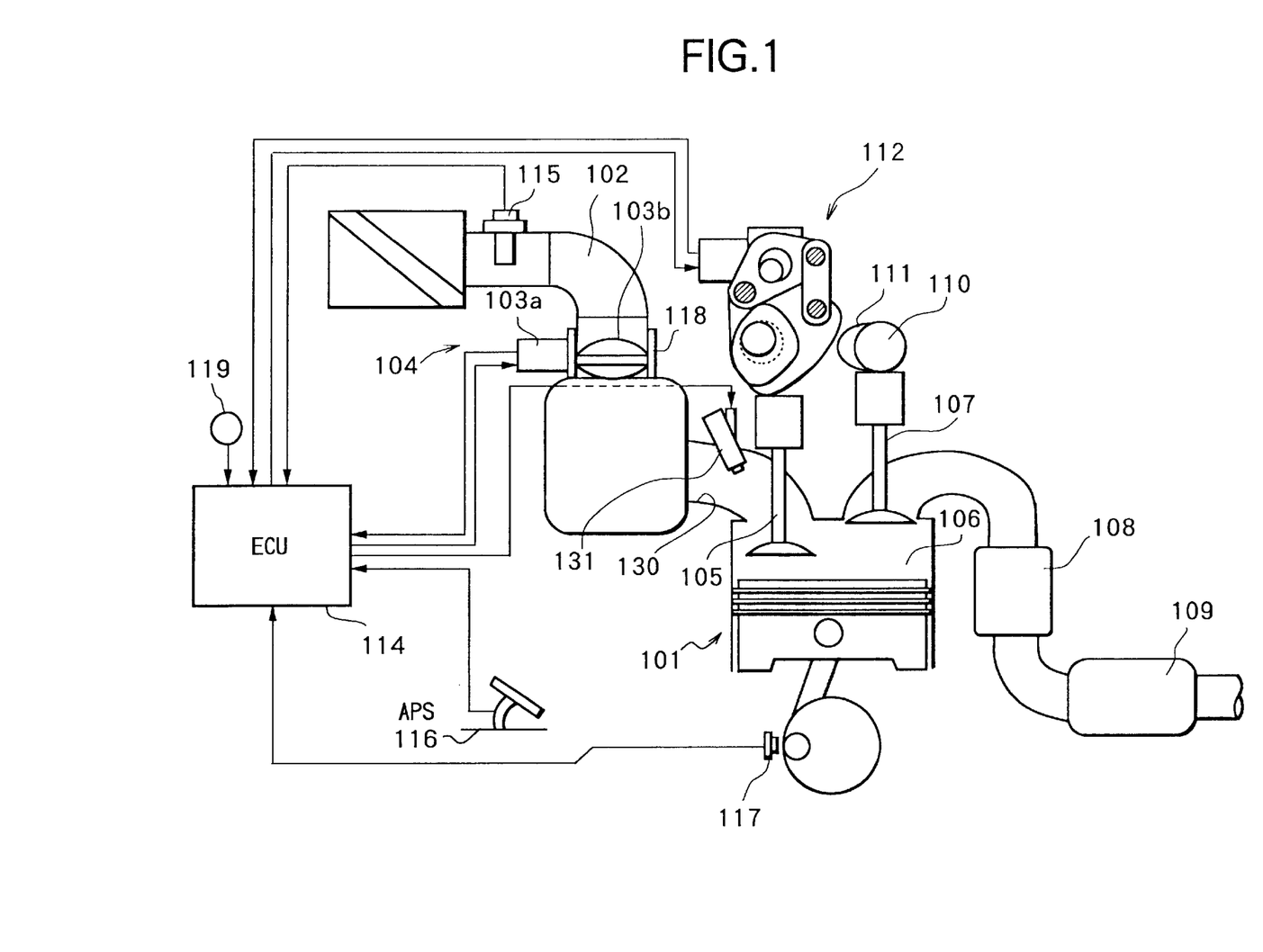
FIG. 1 is a diagram of a system structure of an internal combustion engine.

FIG. 1 is a structural diagram of an internal combustion engine for vehicle in the embodiment. In an intake passage 102 of an internal combustion engine 101, an electronically controlled throttle 104 is disposed for driving a throttle valve 103b to open and close by a throttle motor 103a. Air is sucked into a combustion chamber 106 via electronically controlled throttle 104 and an intake valve 105.

A combusted exhaust gas is discharged from combustion chamber 106 via an exhaust valve 107, purified by a front catalyst 108 and a rear catalyst 109, and then emitted into the atmosphere.

Exhaust valve 107 is driven to open and close while maintaining a valve lift amount and a valve operating angle thereof by a cam 111 axially supported by an exhaust side camshaft 110. On the contrary, a valve lift amount and a valve operating angle of intake valve 105 are varied continuously by a variable valve mechanism 112. Note, the valve lift amount and the valve operating angle are varied simultaneously, so that, when a characteristic of one of the valve lift amount and the valve operating angle is determined, a characteristic of the other is also determined.

A control unit 114 incorporating therein a microcomputer, controls electronically controlled throttle 104 and variable valve mechanism 112 according to an accelerator pedal opening detected by an accelerator pedal sensor APS 116, so that a target intake air amount corresponding to an accelerator opening can be obtained by an opening of throttle valve 104b and an opening characteristic of intake valve 105.

Control unit 114 receives various detection signals from an air flow meter 115 detecting an intake air amount Q of engine 101, a crank angle sensor 117 taking out a rotation signal from a crankshaft, a throttle sensor 118 detecting an opening TVO of throttle valve 103b, a water temperature sensor 119 detecting a cooling water temperature Tw of engine 101, and the like, in addition to accelerator pedal sensor APS 116.

Further, an electromagnetic fuel injection valve 131 is disposed on an intake port 130 at the upstream side of intake valve 105 of each cylinder. Fuel injection valve 131 injects fuel adjusted at a predetermined pressure toward intake valve 105 when driven to open by an injection pulse signal from control unit 114.

Figure 2:
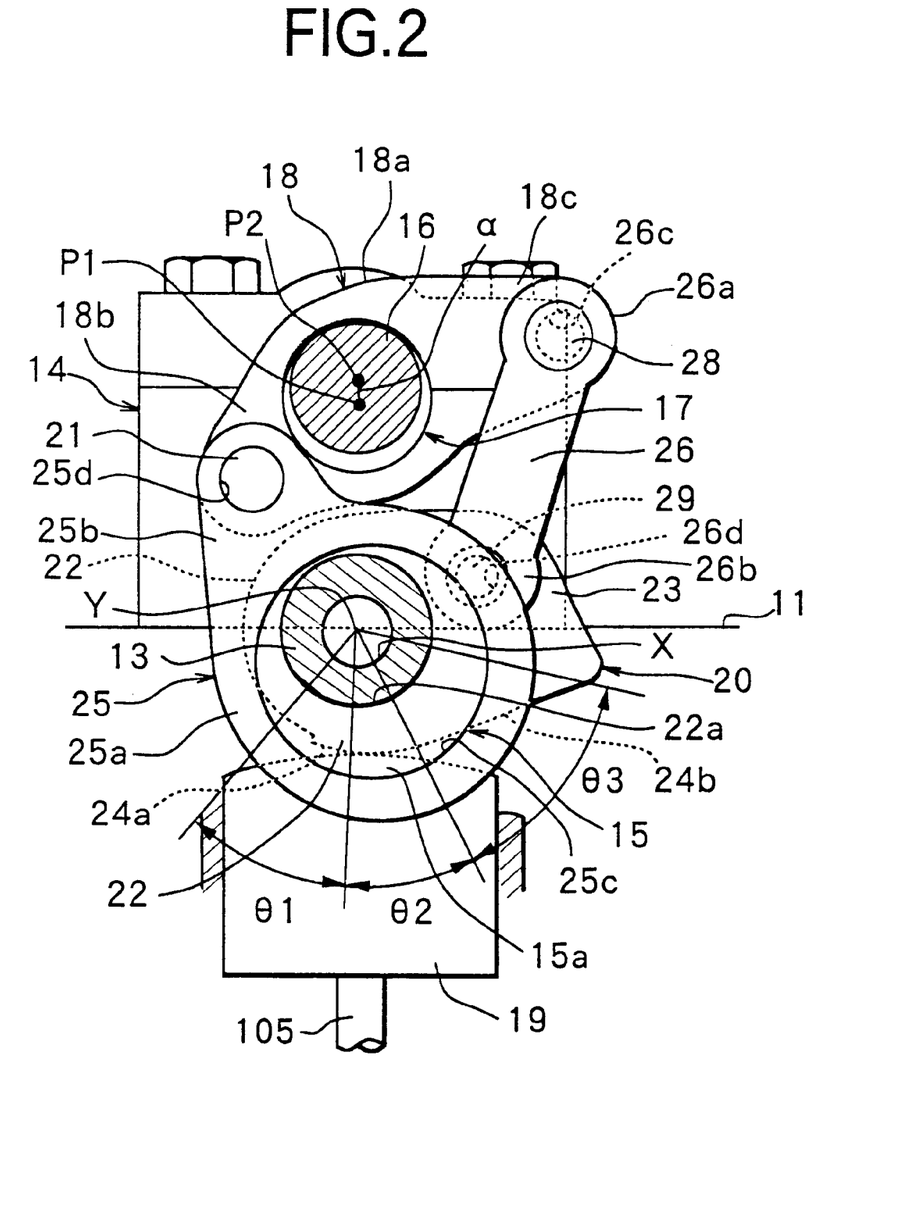
FIG. 2 is a cross section view showing a variable valve mechanism (A—A cross section of FIG. 3).
Figure 3:
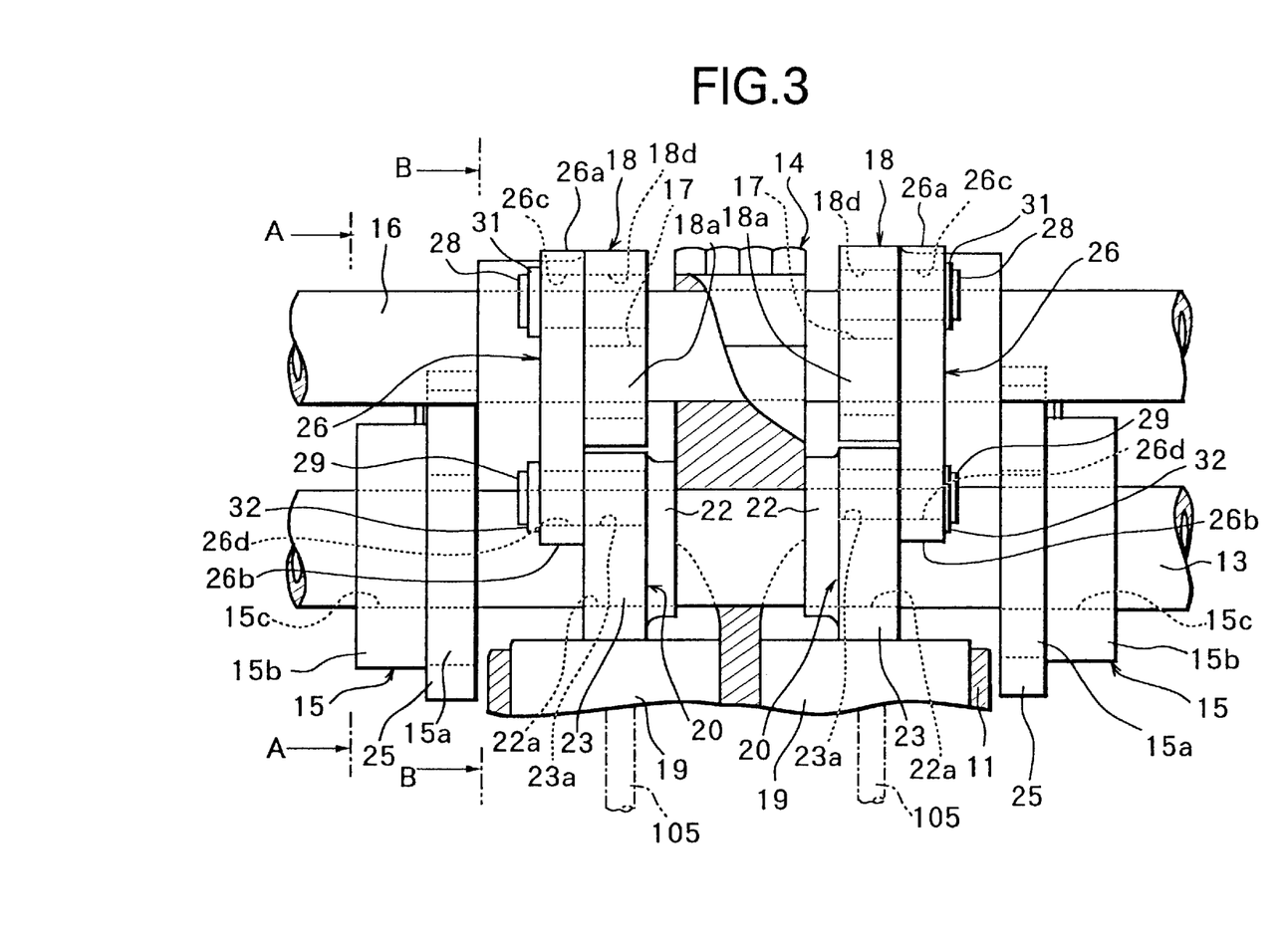
FIG. 3 is a side elevation view of the variable valve mechanism.
Figure 4:
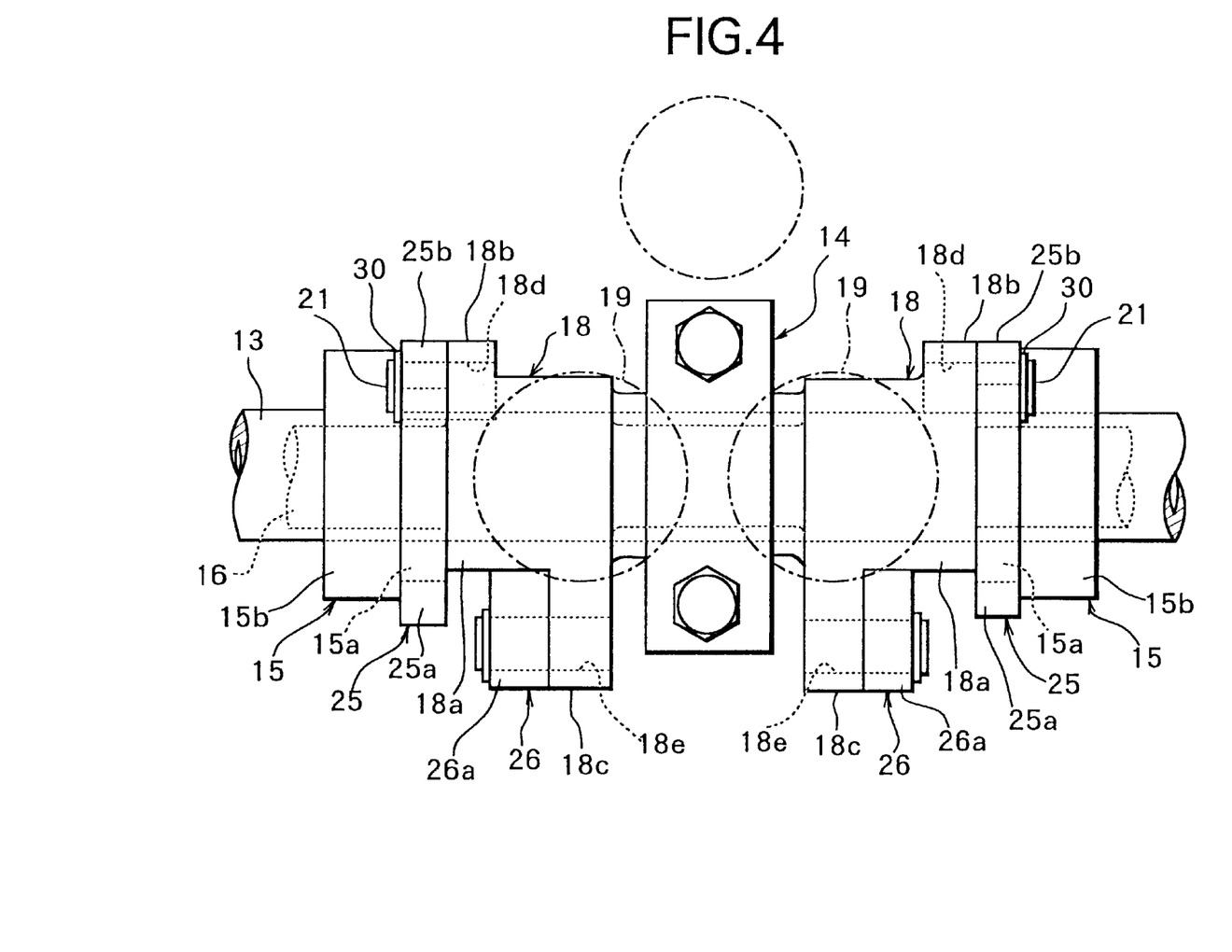
FIG. 4 is a top plan view of the variable valve mechanism.

FIG. 2 to FIG. 4 show in detail the structure of variable valve mechanism 112.

Variable valve mechanism 112 shown in FIG. 2 to FIG. 4 includes a pair of intake valves 105, 105, a hollow camshaft (drive shaft) 13 rotatably supported by a cam bearing 14 of a cylinder head 11, two eccentric cams (drive cams) 15, 15 axially supported by camshaft 13, a control shaft 16 rotatably supported by cam bearing 14 and arranged at an upper position of camshaft 13, a pair of rocker arms 18, 18 swingingly supported by control shaft 16 through a control cam 17, and a pair of swing cams 20, 20 independent of each other disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Rocker arms 18, 18, link arms 25, 25, and link members 26, 26 constitute a transmission mechanism.

Figure 5:
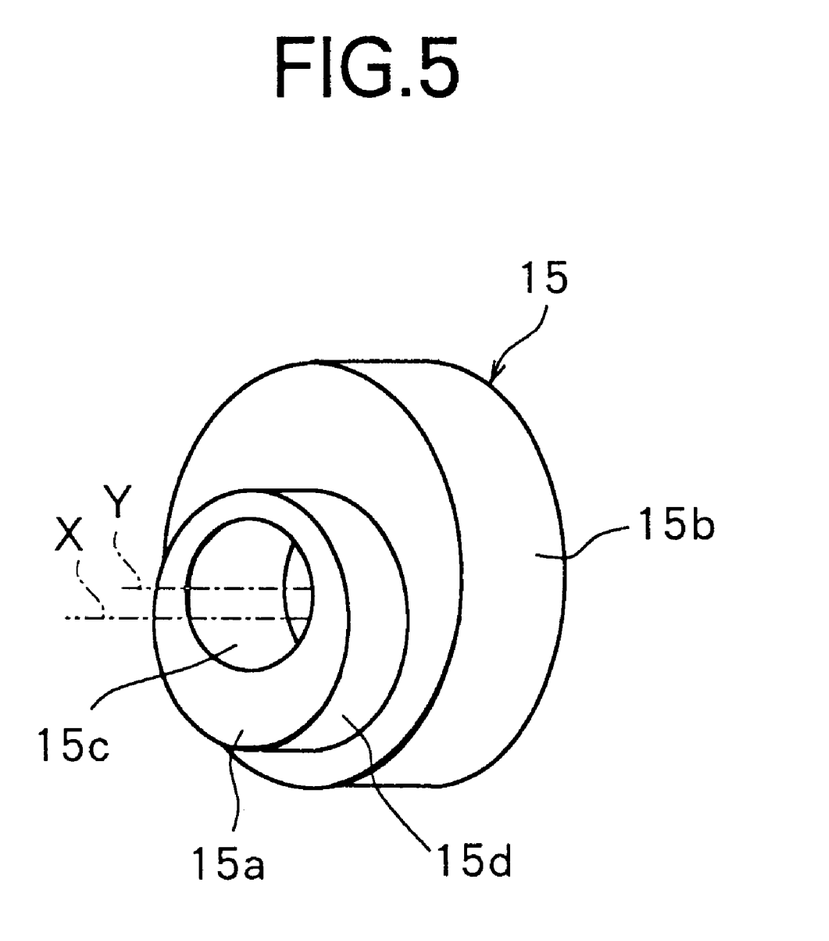
FIG. 5 is a perspective view showing an eccentric cam for use in the variable valve mechanism.

Each eccentric cam 15, as shown in FIG. 5, is formed in a substantially ring shape and includes a cam body 15a of small diameter, a flange portion 15b integrally formed on an outer surface of cam body 15a. An insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outsides of valve lifters 19, 19, respectively so as not to interfere with valve lifters 19, 19.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
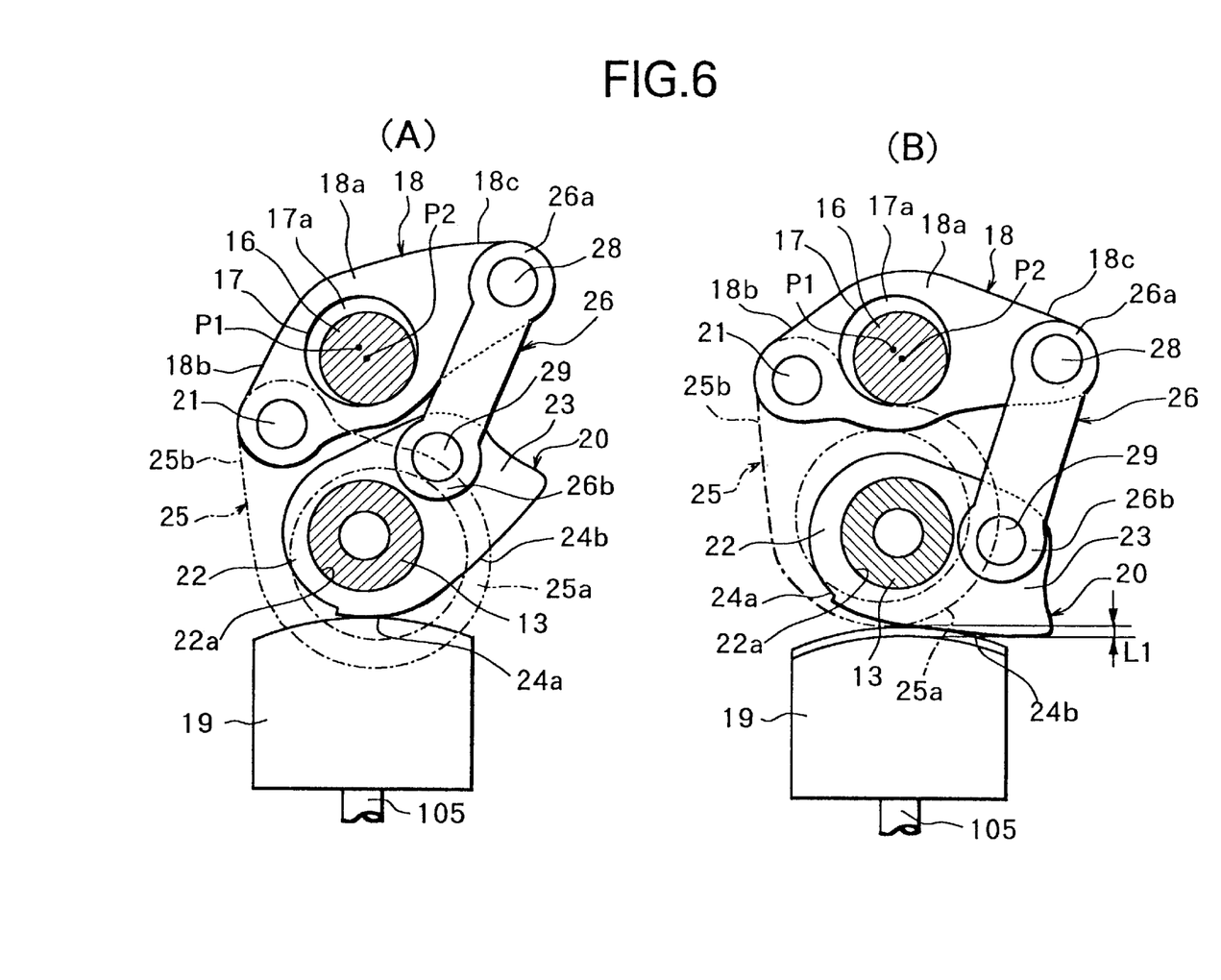
FIG. 6 is a cross section view showing an operation of the variable valve mechanism at a low lift condition (B—B cross section view of FIG. 3).
Figure 7:
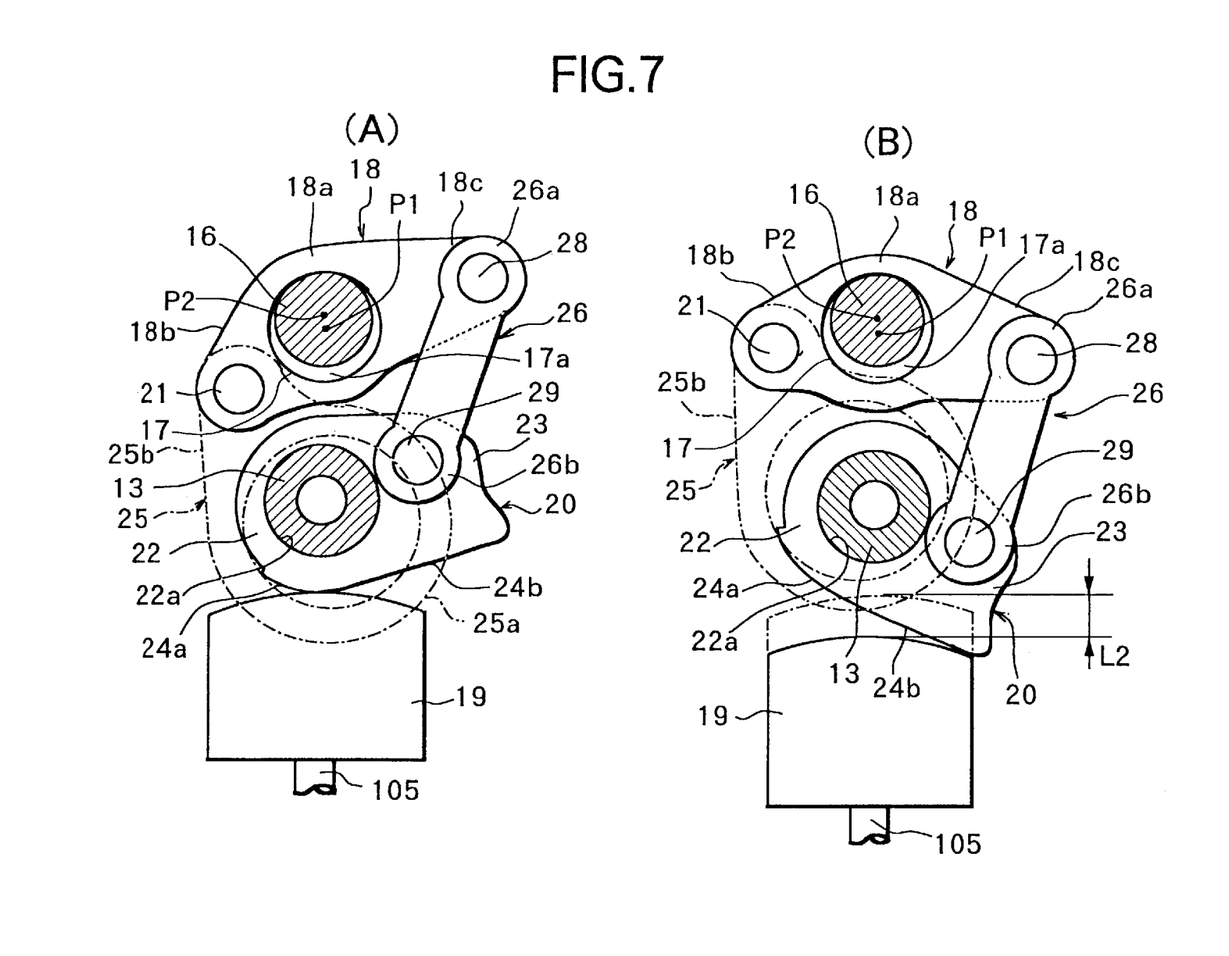
FIG. 7 is a cross section view showing an operation of the variable valve mechanism at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
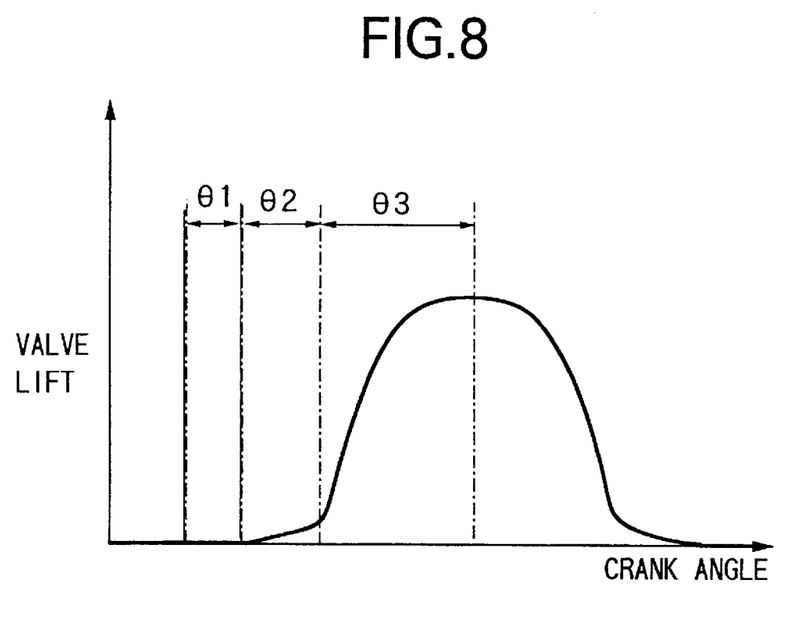
FIG. 8 is a valve lift characteristic diagram corresponding to a base end face and a cam surface of a swing cam in the variable valve mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift amount is varied, and by driving control shaft 16 to rotate, the position of the center axis P2 of control shaft 16 relative to the center axis P1 of control cam 17 is changed.

Figure 9:
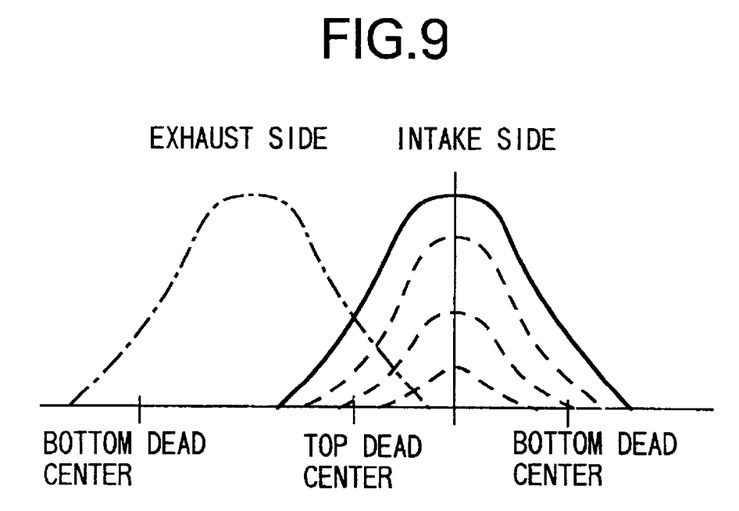
FIG. 9 is a characteristic diagram showing valve timing and a valve lift of the variable valve mechanism.
Figure 10:
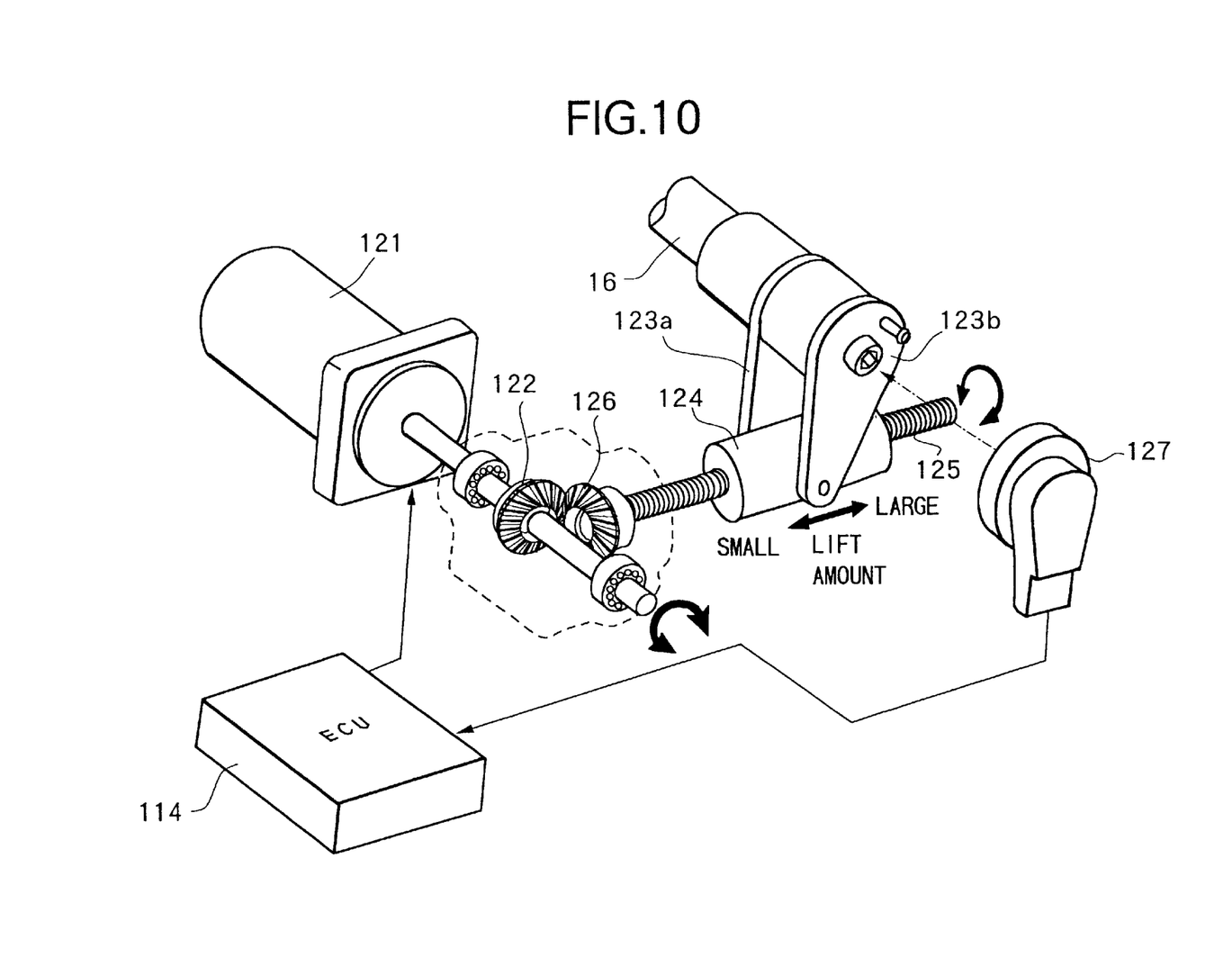
FIG. 10 is a perspective view showing a rotational driving mechanism of a control shaft in the variable valve mechanism.

Control shaft 16 is driven to rotate within a predetermined angle range by a DC servo motor (actuator) 121 as shown in FIG. 10. By varying an operating angle of control shaft 16 by DC servo motor 121, the valve lift amount and valve operating angle of intake valve 105 are continuously varied (refer to FIG. 9).

In FIG. 10, DC servo motor 121 is arranged so that the rotation shaft thereof is parallel to control shaft 16, and a bevel gear 122 is axially supported by the tip portion of the rotation shaft.

On the other hand, a pair of stays 123a, 123b are fixed to the tip end of control shaft 16. A nut 124 is swingingly supported around an axis parallel to control shaft 16 connecting the tip portions of the pair of stays 123a, 123b.

A bevel gear 126 meshed with bevel gear 122 is axially supported at the tip end of a threaded rod 125 engaged with nut 124. Threaded rod 126 is rotated by the rotation of DC servo motor 121, and the position of nut 124 engaged with threaded rod 125 is displaced in an axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, a potentiometer type operating angle sensor 127 detecting the operating angle of control shaft 16 is disposed on the tip end of control shaft 16, as shown in FIG. 10. Control unit 114 feedback controls DC servo motor 121 so that an actual operating angle detected by operating angle sensor 127 coincides with a target operating angle. Here, as mentioned above, since the valve lift amount and the valve operating angle can be varied simultaneously, operating angle sensor 127 detects the valve operating angle and at the same time the valve lift amount.

An actual intake air flow amount in a cylinder portion is measured to control a fuel injection quantity based on the measured value, while controlling intake valve 105 by such a variable valve mechanism to control the intake air amount.

Figure 11:
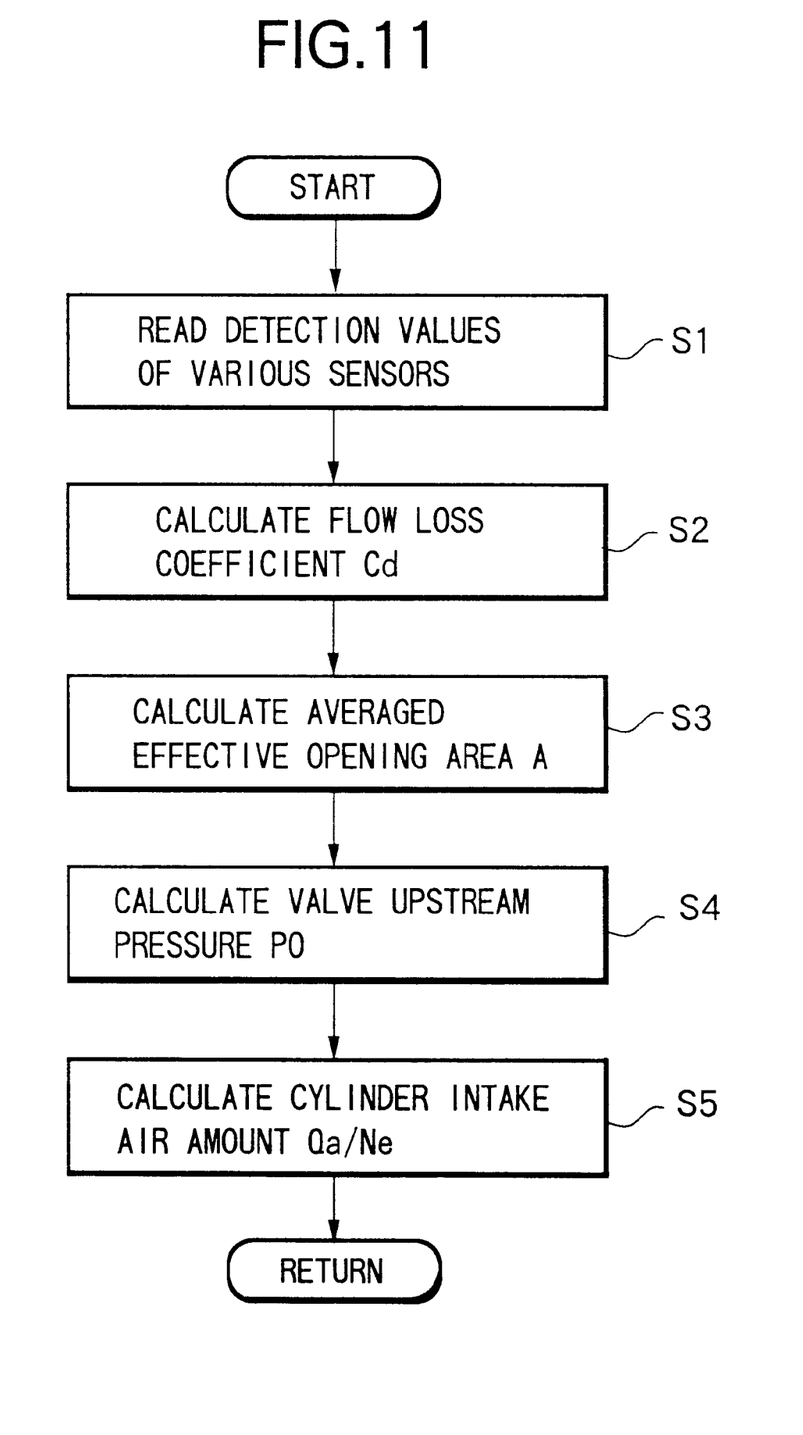
FIG. 11 is a flowchart showing a routine for measuring an intake air amount.

Measurement of intake air flow amount in the cylinder portion by control unit 114 will be described according to a flowchart of FIG. 11.

In step 1, detection values from various sensors are read.

In step 2, a valve flow loss coefficient Cd of intake valve 105 is calculated based on a VEL operating angle VELCOM detected by operating angle sensor 127 and an engine rotation speed detected by crank angle sensor 117.

Figure 12:
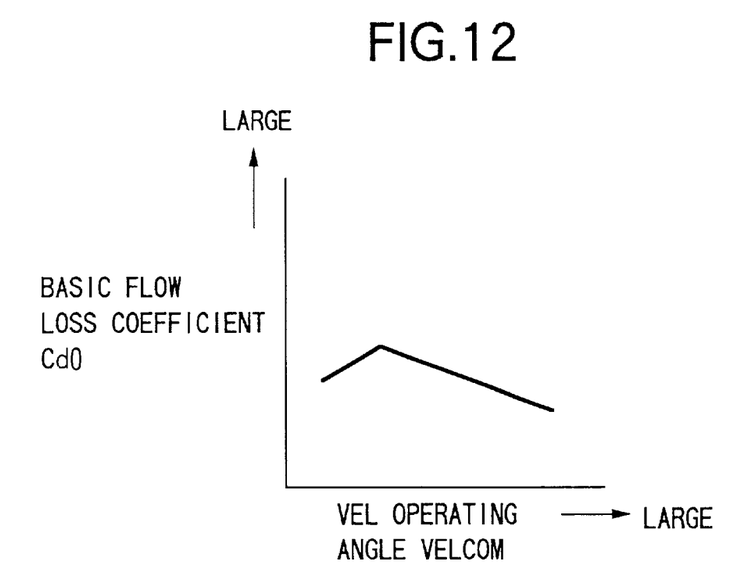
FIG. 12 is map for obtaining a basic flow loss coefficient.
Figure 13:
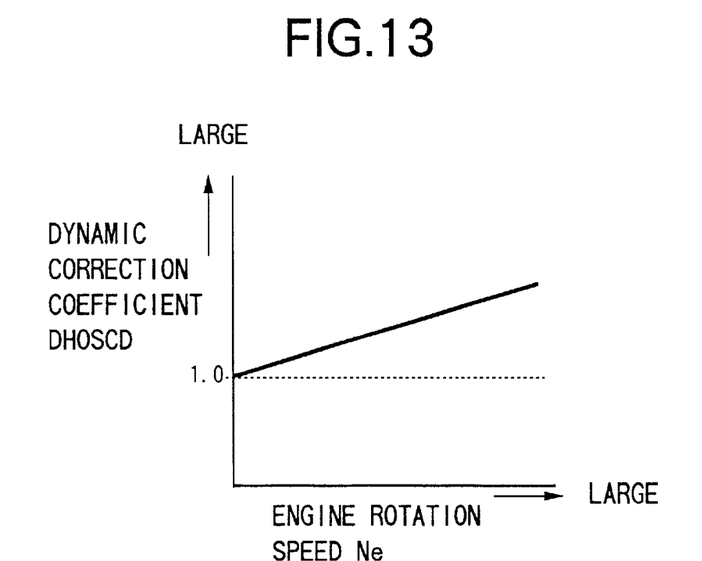
FIG. 13 is a map for obtaining a dynamic correction coefficient.

More specifically, based on VEL operating angle VELCOM (valve operating characteristic), a basic flow loss coefficient Cd0 is calculated by retrieving a map as shown in FIG. 12, and also a dynamic correction coefficient DHOSCD is calculated by retrieving a map shown in FIG. 13. Then, basic flow loss coefficient Cd0 is multiplied by dynamic correction coefficient DHOSCD to calculate valve flow loss coefficient Cd.

Figure 14:
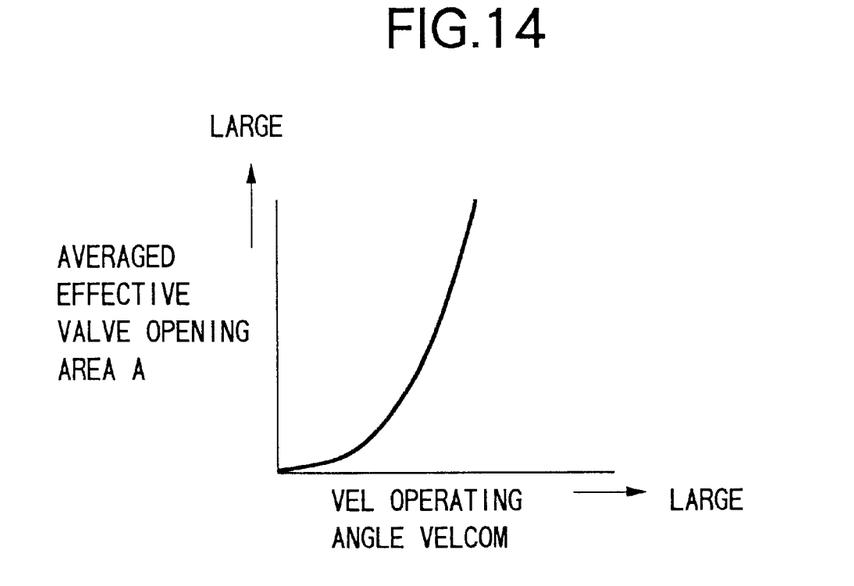
FIG. 14 is a map for obtaining an averaged effective opening area of an intake valve.

In step 3, an averaged effective opening area A of intake valve 105 is calculated based on VEL operating angle VELCOM. More specifically, a value obtained by dividing an integral value of opening area (valve curtain area) of from opening to closing of intake valve 105, by an opening crank angle θ, is calculated as averaged effective opening area A, and data of the calculated value is retrieved using a map for which VEL operating angle VELCOM is allocated (refer to FIG. 14).

Figure 15:
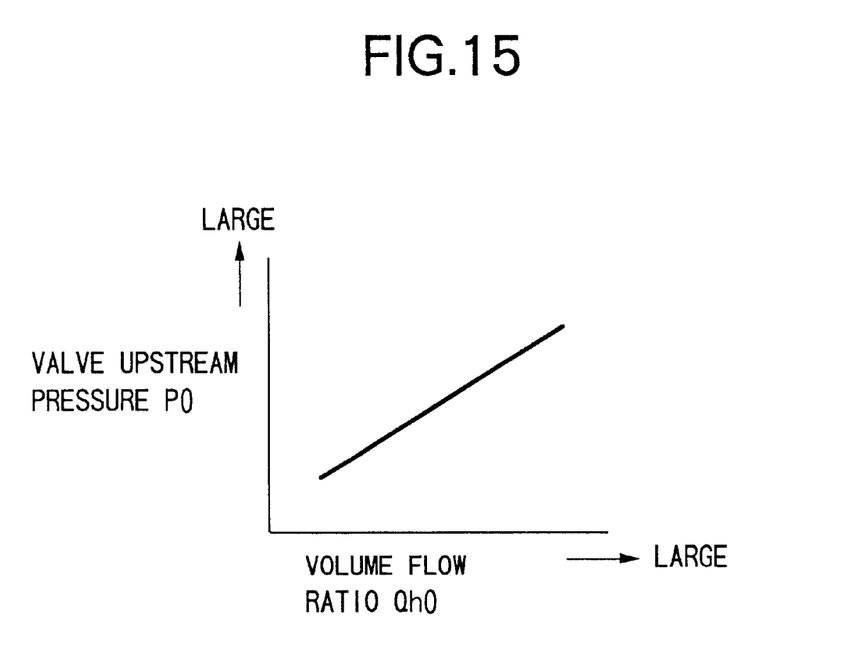
FIG. 15 is a map for obtaining an intake valve upstream pressure.

In step 4, an upstream pressure P0 of intake valve 105 is obtained. In the case where an intake pressure sensor detecting an absolute value is disposed to an intake pipe 102 downstream of throttle valve 103b, a detected value of the intake pressure sensor is used as it is, as the upstream pressure. However, the upstream pressure can be estimated based on an opening of throttle valve 103b and an engine rotation speed Ne. More specifically, if a volume flow ratio QH0 of intake air (a ratio of intake air relative to volume flow at the time when throttle valve is fully opened) is calculated based on the opening of throttle valve 103b and engine rotation speed Ne, since volume flow ratio QH0 and the valve upstream pressure are in a good correlation, the upstream pressure can be estimated by retrieving a one-dimensional map with volume flow ratio QH0 as a parameter (refer to FIG. 15). Further, this map is set relative to a reference (for example, a standard condition) atmosphere pressure. Therefore, in the case where an atmosphere pressure sensor (outside pressure sensor) is provided, if a map retrieval value is corrected based on the atmosphere pressure detected by the atmosphere pressure sensor, it is possible to estimate with higher accuracy upstream pressure P0 of intake valve 105. Especially, in the case where throttle valve 103b is substantially full opened, since upstream pressure P0 of intake valve 105 becomes substantially equal to the atmosphere pressure, the detected value of the atmosphere pressure sensor may be used as it is, as upstream pressure P0 of intake valve 105.

In step 5, the intake air flow amount in the cylinder portion (in a portion passing through intake valve) is calculated based on respective calculated values as follows.

At first, an air flow amount passing through intake valve 105 (that is, a cylinder intake air amount) Qc (kg/sec) can be represented by equations (1), (2) based on an equation of a one-dimensional steady flow of compressed fluid.

$$Qc = \frac{Cd \cdot A \cdot P0}{\sqrt{R \cdot T0}} \left(\frac{Pc}{P0}\right)^{\frac{1}{\gamma}} \sqrt{\frac{2\gamma}{\gamma-1}\left(1-\left(\frac{Pc}{P0}\right)^{\frac{\gamma-1}{\gamma}}\right)} \quad (1)$$

$$Qc = \frac{Cd \cdot A \cdot P0}{\sqrt{R \cdot T0}} \sqrt{\gamma} \left(\frac{2}{\gamma+1}\right)^{\frac{\gamma+1}{2(\gamma-1)}} \quad (2)$$

$$\left(\text{At choke}: \frac{Pc}{P0} \leq \left(\frac{2}{\gamma+1}\right)^{\frac{\gamma}{\gamma-1}}\right)$$

In the above equations, R: a gas constant (=287), γ: a ratio of specific heat (=1.4), Cd: a valve flow loss coefficient, A: valve effective opening area (m²), P0: an valve upstream pressure (Pa), Pc: cylinder pressure (Pa): and T0: a valve upstream temperature (K).

Since a low load condition leads a choke condition, and intake air flow amount Qc at choke time is proportional to a product of flow loss coefficient Cd, effective opening area A and upstream pressure P0 as shown in the equation (2), intake air flow amount Qc can be obtained using these calculated values. A valve upstream temperature T0 can be obtained by simply using a temperature in the vicinity of the standard condition (about 18 to 20° C.) as a fixed value, or in the case where an outside temperature sensor is provided, by performing a correction using a detected value of the outside temperature sensor. However, if an intake temperature sensor is provided, and a correction is performed using a detected value of the outside temperature sensor, valve upstream pressure T0 can be calculated with higher accuracy.

On the other hand, a medium or high load condition leads a no choke condition, and at no choke time, the intake air flow amount in the cylinder portion is changed in real time by the cylinder pressure that is changed sequentially according to piston positions, as shown in the equation (1). However, by integrating to average the intake air flow amount in the cylinder, an intake air flow amount per unit time can be calculated.

The intake air flow amounts calculated in the equations (1) and (2) satisfactorily correspond to intake air flow amounts calculated in simulation. Thus, it becomes obvious that an intake air flow amount can be calculated using these equations (1) and (2).

However, it is substantially difficult and also not practical to calculate the intake air flow amount, while detecting the sequentially changing cylinder pressure by a cylinder pressure sensor, using the equation (1) at no choke time. Here, it is considered that the cylinder pressure for each piston position is generally determined due to the valve characteristic of intake valve. Therefore, a basic intake air flow amount can be obtained by determining flow loss coefficient Cd, averaged effective opening area A and upstream pressure P0 of the valve. Moreover, the detection of intake air flow amount is mainly used for the calculation of fuel injection quantity, and in such a case, the cylinder intake air amount per engine rotation is required.

Therefore, in the present embodiment, a value A·Cd/Ne/VOL# obtained by dividing a product of averaged effective opening area A and valve flow loss coefficient Cd, by engine rotation speed Ne and a discharge amount VOL#, is calculated as a parameter, and a map 1 is prepared, in which data of basic cylinder intake air amount Qa/Ne [Kg] per engine rotation calculated in simulation is allocated for the parameter value.

Figure 16:
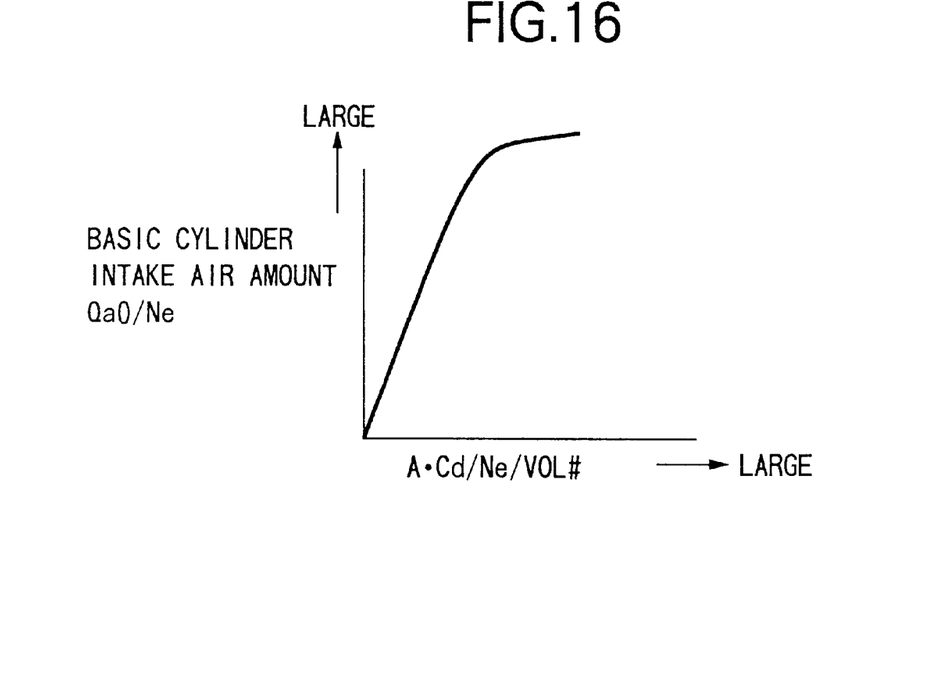
FIG. 16 is a map for obtaining a basic cylinder intake air amount.

FIG. 16 shows a characteristic of map 1, in which basic cylinder intake air amount Qa0/Ne is changed linearly relative to parameter A·Cd/Ne/VOL# in choke area, and is changed in a curve of second order in no choke area.

Further, a map 2 (refer to FIG. 17) is prepared, in which an upstream pressure based correction coefficient Kp is set for correcting basic cylinder intake air amount Qa0/Ne according to valve upstream pressure PO detected or estimated in step 4.

In the case of estimating the intake air flow amount with higher accuracy, a map 3 (refer to FIG. 18) is prepared, in which an upstream temperature based correction coefficiet Kt is set for correcting basic cylinder intake air amount Qa0/Ne according to valve upstream temperature T0, based on outside temperature Ta (an intake air temperature Tm) detected by the outside temperature sensor (or an intake air temperature sensor in an intake manifold portion).

Figure 17:
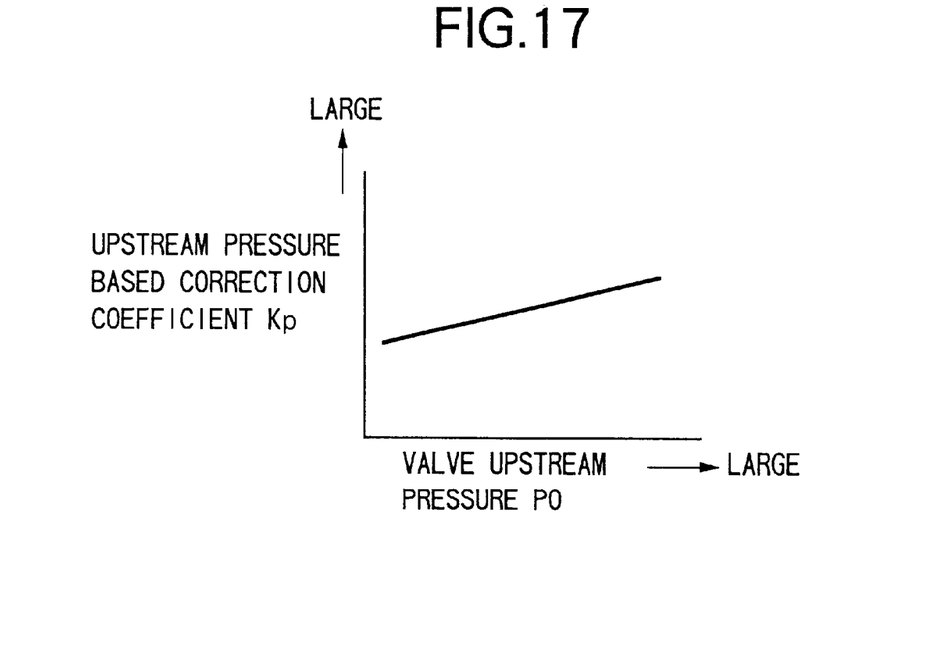
FIG. 17 is a map for obtaining an upstream pressure based correction coefficient.
Figure 18:
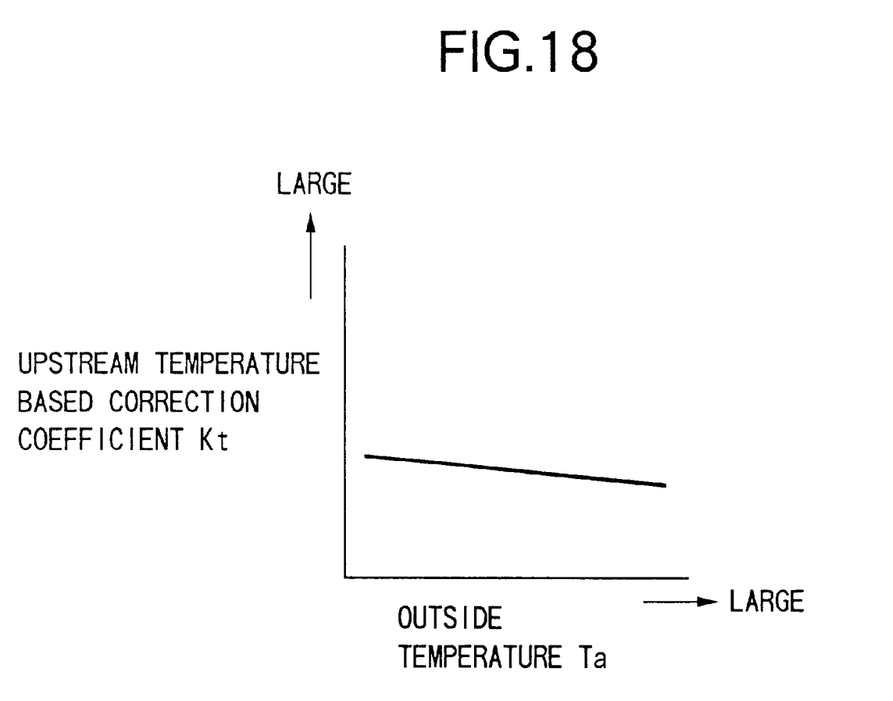
FIG. 18 is a map for obtaining an upstream temperature based correction coefficient.

Then, as shown in the following equation, basic cylinder intake air amount Qa0/Ne retrieved from map 1 based on calculated parameter A·Cd/NE/VOL#, is corrected by being multiplied by upstream pressure based correction coefficient Kp retrieved from map 2 based on valve upstream pressure PO and upstream temperature based correction coefficient Kt retrieved from map 3 based on outside temperature Ta (intake air temperature Tm), to calculate a mass cylinder intake air amount Qa/Ne.

$$Qa/Ne=(Qa0/Ne)\cdot Kp\cdot Kt$$

This mass cylinder intake air amount (Qa/Ne) is used as a value proportional to a basic fuel injection quantity when the fuel injection quantity is calculated.

In the above manner, in the case where the operating characteristic of intake valve is varied by the variable valve mechanism to control the intake air amount, it is possible to detect with high accuracy the intake air amount, and further it is possible to improve torque control performance.

The entire contents of Japanese Patent Application No. 2001-338292, filed Nov. 2, 2001, are incorporated herein by reference.

While only a selected embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

What is claimed are:

1. An apparatus for measuring an intake air flow amount of an internal combustion engine,
    wherein said internal combustion engine is provided with a variable valve mechanism that varies a valve operating characteristic of an intake valve, and
    said apparatus comprises:
        a detecting unit detecting a valve operating characteristic of said intake valve; and
        a calculating unit calculating a flow loss coefficient and an effective opening area of said intake valve based on said valve operating characteristic, to calculate an intake air flow amount in a cylinder portion based on parameters inclusive of said calculated flow loss coefficient and effective opening area.

2. An apparatus for measuring an intake air flow amount of an internal combustion engine according to claim 1,
    wherein said calculating unit corrects a basic flow loss coefficient calculated based on the valve operating characteristic of the intake valve, based on an engine rotation speed, to calculate said flow loss coefficient.

3. An apparatus for measuring an intake air flow amount of an internal combustion engine according to claim 1,
    wherein said calculating unit calculates the intake air flow amount in the cylinder portion using an upstream pressure of said intake valve in addition to the flow loss coefficient and effective opening area of said intake valve.

4. An apparatus for measuring an intake air flow amount of an internal combustion engine according to claim 3,
    wherein said internal combustion engine is provided with a throttle valve on an upstream of the intake valve, and
    said calculating unit calculates the upstream pressure of the intake valve used for calculating said intake air flow amount in the cylinder portion, based on an opening of said throttle valve and an engine rotation speed.

5. An apparatus for measuring an intake air flow amount of an internal combustion engine according to claim 3,
    wherein said calculating unit detects directly the upstream pressure of the intake valve used for calculating said intake air flow amount in the cylinder portion, by an intake pressure sensor.

6. An apparatus for measuring an intake air flow amount of an internal combustion engine according to claim 3,
    wherein said calculating unit estimates the upstream pressure of the intake valve used for calculating said intake air flow amount in the cylinder portion, using the atmosphere pressure detected by an atmosphere pressure sensor.

7. An apparatus for measuring an intake air flow amount of an internal combustion engine according to claim 6,
    wherein said internal combustion engine is provided with a throttle valve on an upstream of the intake valve, and
    said calculating unit uses the atmosphere pressure detected by said atmosphere pressure sensor as it is, as the upstream pressure of the intake valve used for calculating said intake air flow amount in the cylinder portion, when the intake air flow amount is controlled by said variable valve mechanism while substantially full opening said throttle valve.

8. An apparatus for measuring an intake air flow amount of an internal combustion engine according to claim 1,
    wherein said calculating unit uses an intake air temperature at an upstream of said intake valve, for calculating said intake air flow amount in the cylinder portion.

9. An apparatus for measuring an intake air flow amount of an internal combustion engine according to claim 1,
    wherein said calculating unit comprises a map, in which basic value data of cylinder intake air amount per engine rotation is allocated for a parameter proportional to a value obtained by dividing a product of the flow loss coefficient and the effective opening area, by an engine rotation speed.

10. An apparatus for measuring an intake air flow amount of an internal combustion engine according to claim 1,
    wherein said variable valve mechanism comprises:
        a drive shaft rotating in synchronism with a crankshaft;
        a drive cam fixed to said drive shaft;
        a swing cam swinging to operate said intake valve to open and close;
        a transmission mechanism with one end connected to said drive cam side and the other end connected to said swing cam side;
        a control shaft having a control cam changing the position of said transmission mechanism; and an actuator rotating said control shaft, and varies the valve operating characteristic of said intake valve by rotatably controlling said control shaft by said actuator.

11. An apparatus for measuring an intake air flow amount of an internal combustion engine, wherein said internal combustion engine is provided with a variable valve mechanism that varies a valve operating characteristic of an intake valve, and said apparatus comprises:

valve operating characteristic detecting means for detecting a valve operating characteristic of said intake valve;

flow loss coefficient calculating means for calculating a flow loss coefficient of said intake valve based on said valve operating characteristic;

effective opening area calculating means for calculating an effective opening area of said intake valve based on said valve operating characteristic; and intake air flow amount calculating means for calculating an intake air flow amount in a cylinder portion based on parameters inclusive of said calculated flow loss coefficient and effective opening area.

12. A method of measuring an intake air flow amount of an internal combustion engine, comprising the steps of:

detecting a valve operating characteristic of an intake valve that is varied by a variable valve mechanism provided in said internal combustion engine;

calculating a flow loss coefficient and an effective opening area of said intake valve based on said valve operating characteristic; and calculating an intake air flow amount in a cylinder portion based on parameters inclusive of said calculated flow loss coefficient and effective opening area.

13. A method of measuring an intake air flow amount of an internal combustion engine according to claim 12, wherein a basic flow loss coefficient calculated based on the valve operating characteristic of the intake valve, is corrected based on an engine rotation speed, to calculate said flow loss coefficient.

14. A method of measuring an intake air flow amount of an internal combustion engine according to claim 12, wherein the intake air flow amount in the cylinder portion is calculated using an upstream pressure of said intake valve in addition to the flow loss coefficient and effective opening area of said intake valve.

15. A method of measuring an intake air flow amount of an internal combustion engine according to claim 12, wherein the upstream pressure of the intake valve used for calculating said intake air flow amount in the cylinder portion, is calculated based on an opening of a throttle valve provided on an upstream of the intake valve and an engine rotation speed.

16. A method of measuring an intake air flow amount of an internal combustion engine according to claim 12, wherein the upstream pressure of the intake valve used for calculating said intake air flow amount in the cylinder portion, is detected directly by an intake pressure sensor.

17. A method of measuring an intake air flow amount of an internal combustion engine according to claim 14, wherein the upstream pressure of the intake valve used for calculating said intake air flow amount in the cylinder portion, is estimated using the atmosphere pressure detected by an atmosphere pressure sensor.

18. A method of measuring an intake air flow amount of an internal combustion engine according to claim 17, wherein the atmosphere pressure detected by said atmosphere pressure sensor is used as it is, as the upstream pressure of the intake valve used for calculating said intake air flow amount in the cylinder portion, when the intake air flow amount is controlled by said variable valve mechanism while substantially full opening a throttle valve provided on an upstream of the intake valve.

19. A method of measuring an intake air flow amount of an internal combustion engine according to claim 12, wherein an intake air temperature at an upstream of said intake valve, is used for calculating said intake air flow amount in the cylinder portion.

20. A method of measuring an intake air flow amount of an internal combustion engine according to claim 14, wherein said intake air flow amount in the cylinder portion is calculated by retrieving a map, in which basic value data of cylinder intake air amount per engine rotation is allocated for a parameter proportional to a value obtained by dividing a product of the flow loss coefficient and the effective opening area, by an engine rotation speed.

21. A method of measuring an intake air flow amount of an internal combustion engine according to claim 14, wherein said variable valve mechanism comprises:

a drive shaft rotating in synchronism with a crankshaft;

a drive cam fixed to said drive shaft;

a swing cam swinging to operate said intake valve to open and close;

a transmission mechanism with one end connected to said drive cam side and the other end connected to said swing cam side;

a control shaft having a control cam changing the position of said transmission mechanism; and an actuator rotating said control shaft, and varies the valve operating characteristic of said intake valve by rotatably controlling said control shaft by said actuator.

* * * * *